United States Patent [19]

Kojima et al.

[11] Patent Number: 4,608,561
[45] Date of Patent: Aug. 26, 1986

[54] TIME DIVISION MULTIPLEXING LOAD CONTROL SYSTEM HAVING MANUAL SWITCH FOR DIRECTLY CONTROLLING LOADS

[75] Inventors: Yutaka Kojima; Toshiyuki Masuda; Nobuo Hisamatsu, all of Mie, Japan

[73] Assignee: Matsushita Electric Works, Ltd., Osaka, Japan

[21] Appl. No.: 531,502

[22] Filed: Sep. 12, 1983

[30] Foreign Application Priority Data

Sep. 20, 1982 [JP] Japan .................. 57-163561

[51] Int. Cl.[4] ................................. H04Q 1/00
[52] U.S. Cl. ................. 340/825.52; 340/825.07; 340/825.18; 370/92
[58] Field of Search ............... 307/3, 11, 12, 69, 70; 340/825.52, 825.06, 825.07, 825.17, 825.18; 370/92, 93

[56] References Cited

U.S. PATENT DOCUMENTS

| | | | |
|---|---|---|---|
| 3,622,992 | 11/1971 | Schoentvitz | 340/825.17 |
| 3,644,894 | 2/1972 | McCrea | 340/825.17 X |
| 3,842,249 | 10/1974 | Geyer et al. | |
| 3,993,977 | 11/1976 | Gilbert | 340/825.18 X |
| 4,131,882 | 12/1978 | Hollabaugh et al. | 340/825.06 X |
| 4,136,333 | 1/1979 | Samida et al. | 340/825.17 X |
| 4,156,866 | 5/1979 | Miller | 340/825.52 X |
| 4,173,754 | 11/1979 | Feiker | 340/825.52 X |
| 4,200,862 | 4/1980 | Campbell et al. | 307/3 X |
| 4,360,912 | 11/1982 | Metz et al. | 370/92 X |
| 4,454,509 | 6/1984 | Buennagel et al. | 340/825.06 X |

FOREIGN PATENT DOCUMENTS

| | | |
|---|---|---|
| 52-14186 | 2/1977 | Japan . |
| 56-61884 | 5/1981 | Japan . |
| 58-66491 | 4/1983 | Japan . |
| 58-66492 | 4/1983 | Japan . |
| 1589748 | 5/1981 | United Kingdom . |

OTHER PUBLICATIONS

"Serial Network Simplifies the Design of Multiple Microcomputers Systems", D. Folkes, Mostek Corporation, Apr. 1981.

Primary Examiner—Ulysses Weldon
Attorney, Agent, or Firm—Stevens, Davis, Miller & Mosher

[57] ABSTRACT

A time division multiplexing load control system having a central controller unit for controlling individual terminal units to connect and disconnect loads connected respectively thereto and manual switch means for directly controlling the loads without reverting to the central controller unit is disclosed. A plurality of terminal units are connected through a shared line to the central controller unit to be controlled thereby so as to turn on/off the loads connected to respective terminal units. Each terminal unit connecting the loads is provided with a load-switching circuit for actuating respective load driving relays incorporated therein to connect and disconnect the loads. The load-switching circuit includes switch means which responds to output data signal from the central controller unit to open and close the load-switching circuit for the ON/OFF drive of the load remote from the central controller unit. Also included in each load-switching circuit are manual switch means for actuating the load driving relay independently of the output signal from the controller unit and detecting means for detecting the state of the load driving relay and transmitting such state to the controller unit so that the controller unit always acknowledges the load condition, irrespective of whether the load has been driven by the controller unit or by the manual switch means manipulated by a person near the load.

2 Claims, 13 Drawing Figures

TIME DIVISION MULTIPLEXING LOAD CONTROL SYSTEM HAVING MANUAL SWITCH FOR DIRECTLY CONTROLLING LOADS

BACKGROUND OF THE INVENTION

1. Field of the Invention

This invention is directed to a time division multiplexing load control system and, more particularly, to a time division multiplexing load control system comprising a central controller unit which controls terminal units to connect and disconnect loads connected thereto and manual switch means located on the side of each terminal unit which controls the loads independently of, but without disturbing, the central controller unit.

2. Description of the Prior Art

In a conventional time division multiplexing transmission control system wherein a central controller unit accesses sequentially a plurality of terminal units connected thereto, it takes an increasing amount of time to complete a control as the number of terminal units increases. For example, assuming an access time per channel of 15 msec, the entire access time for a system containing 256 channels will be as much as 3.84 sec ($256 \times 15 \times 10^{-3}$ sec), so that when the terminal units are utilized, such as for lighting control, an operator may sometimes wait a few seconds after the moment of his operation until the desired lighting fixture goes on or off. Therefore, the operator may be uncertain of his manipulation during such a time-lag, and particularly an operator in a dark room will have a false anxiety until the light turns on. This undesirable time-lag, from the instant of manipulating a switch to the moment when the load actually responds to turn on and off, will increase with an increasing number of loads to be controlled.

SUMMARY OF THE INVENTION

The present invention has been designed in view of the foregoing and provides an arrangement wherein a plurality of terminal units are connected to a single central controller unit to be respectively controlled thereby so as to turn on and off the loads connected to the respective terminal units, the terminal unit connecting the loads incorporating load-switching circuits in number corresponding to the loads being controlled. Each load-switching circuit includes reversing switch means for actuating a load driving relay incorporated therein in response to the instruction from the central controller unit to connect and disconnect the designated load, manual switch means for driving the load-switching circuit to directly control the load without reverting to the central controller unit, and detecting means for detecting the load condition and transmitting the load condition to the central controller unit so that the central controller unit can always acknowledge the load condition, irrespective of whether the load has been controlled by responding to the central controller unit or by the manual switch means. Thus, the load connected to the respective terminal unit can, in addition to being controlled by the central controller unit, be connected and disconnected directly and instantaneously by the corresponding manual switch means which is to be manipulated by an operator near that load, and the resulting change in the load condition can be simultaneously detected by the detecting means within the same load-switching circuit and be transmitted to the central controller unit.

Accordingly, it is a primary object of the present invention to provide a time division multiplexing load control system, which is a two-way control system, capable of being controlled selectively by the central controller unit and by manual switch means on the terminal side, thereby enabling an operator to connect and disconnect the load directly without reverting to the central controller unit for turning on/off the load instantaneously, which saves operation time on a load side, wile maintaining the load under the control of the central controller unit.

It is another object of the present invention to provide a time division multiplexing load control system, in which the load condition changed by the central controller unit or the manual switch means can be detected within the same load-switching circuit, which is used for turning on/off the load so as to eliminate the necessity of another independent means for detecting or monitoring the load condition which would complicate the structure of the terminal unit and the wiring therefor.

In a preferred embodiment of the present invention, there is disclosed a useful structure wherein each load driving relay has, for indicating the state thereof, indicator means which can be easily recognized by an operator. It is therefore a further object of the present invention to provide a time division multiplexing load control system which informs the operator near the load of his operation. Also disclosed in the preferred embodiment of the present invention is a host computer which is adapted to be connected to the central controller unit for controlling the whole system. This host computer, having a keyboard and a display means, transmits commands to the central controller unit, such that the controller unit will receive information, such as load control procedures, through the keyboard of the host computer to control each load, and information about the control of each terminal unit can be displayed on the display means of the host computer.

It is a still further object of the present invention to provide a time division multiplexing load control system which is capable of being easily operated by the host computer, of the type being now familiar to the public and becoming more available in the home and office, e.g., a microprocessor based microcomputer. These and other objects and the advantages of the present invention will become apparent from the consideration of the following detailed description, when taken into conjunction with the accompanying drawings.

DETAILED DESCRIPTION OF THE PREFERRED EMBODIMENT

Figure 1:
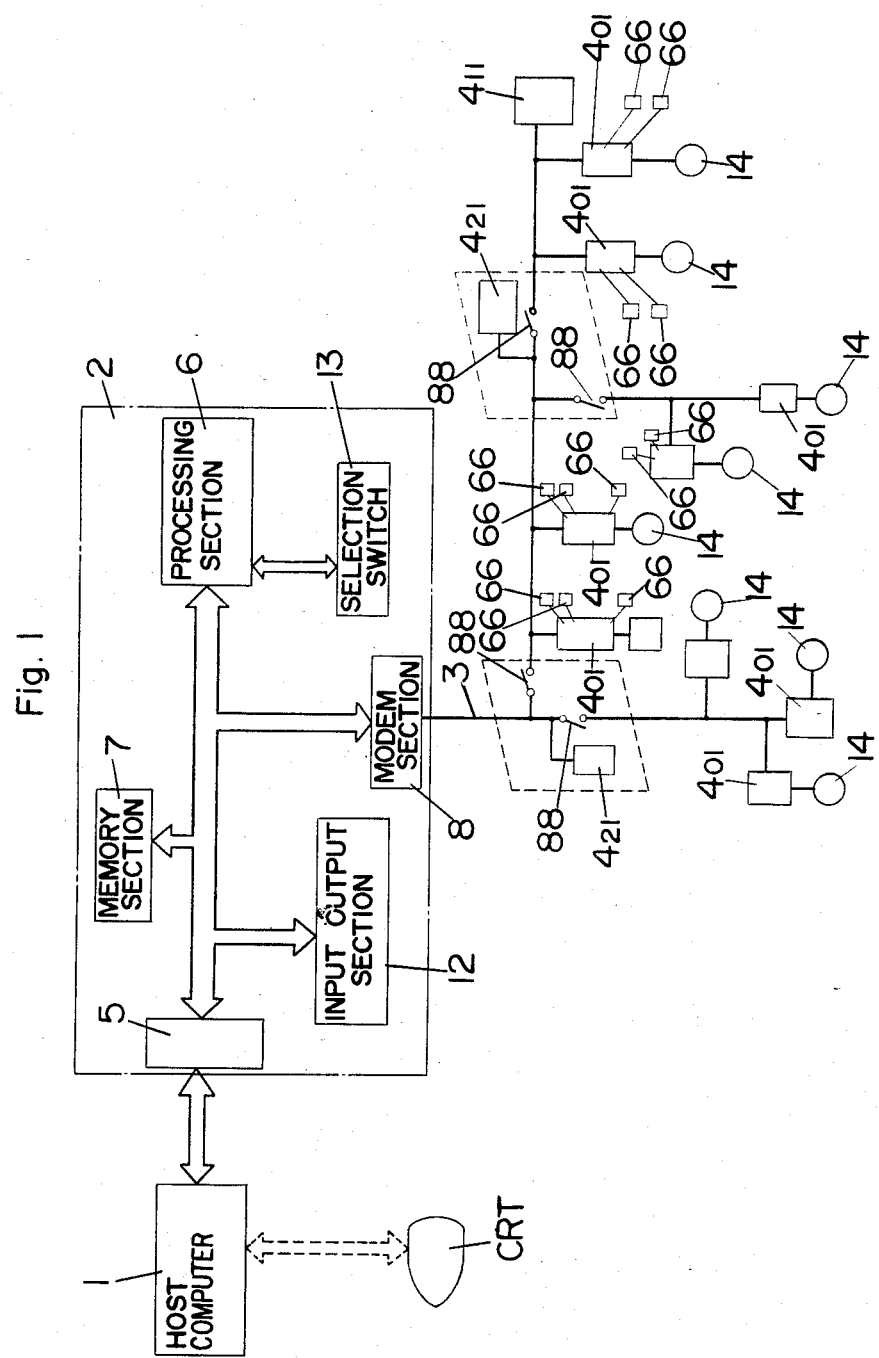
FIG. 1 is a simplified fragmentary block diagram of a time division multiplexing load control system constructed in accordance with a preferred embodiment of the present invention.
Figure 2:
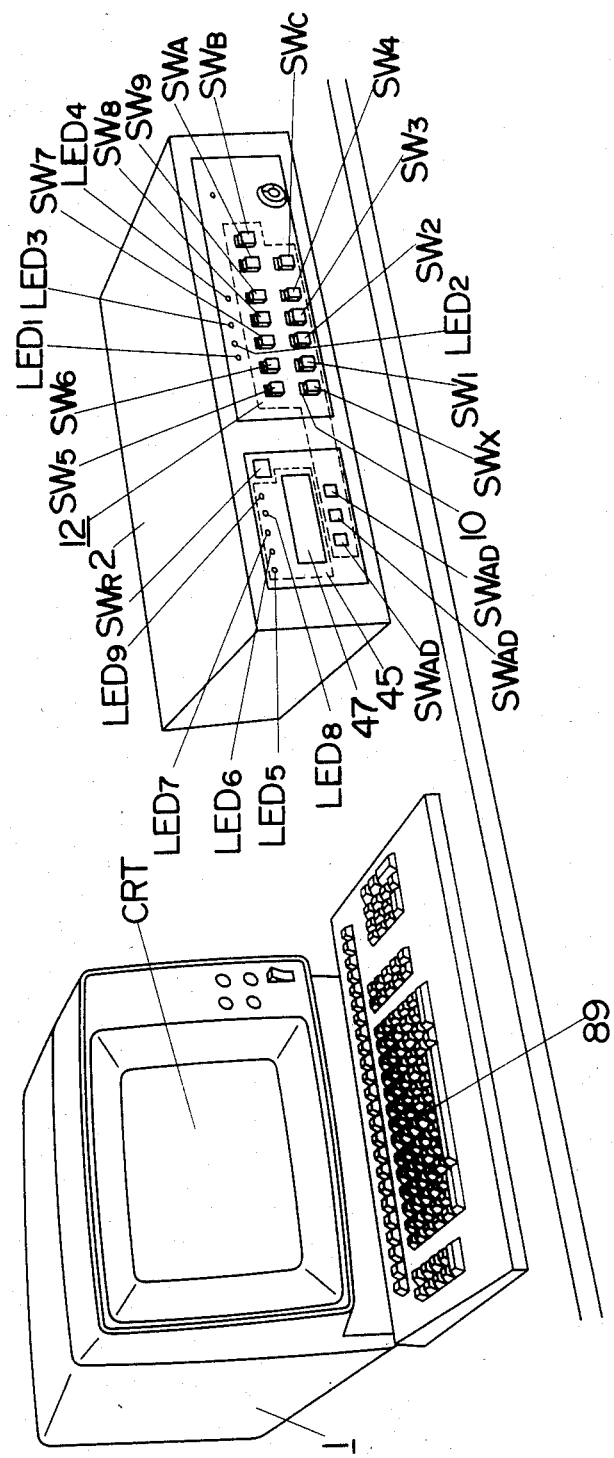
FIG. 2 is a perspective view showing a central controller unit and a host computer adapted to be connected thereto, both employed in the above embodiment.
Figure 3:
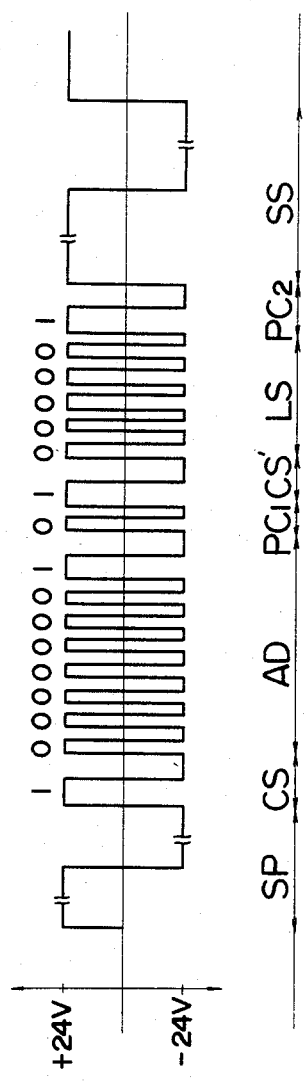
FIG. 3 is a wave form diagram showing a set of output data signals transmitted as a pulse train from the central controller unit to a designated terminal unit and basically composed of an address signal AD, a control signal LS, and a response-waiting signal SS for receiving a response signal back from the terminal unit.

Referring now to the drawings, and particularly to FIG. 1 showing a somewhat simplified structure of the whole system of the preferred embodiment in accordance with the present invention, a plurality of terminal units 4 are connected to a central controller unit 2 by a shared transmission line 3 composed of two wires to be controlled thereby. A host computer 1 of the type which is commonly known as a general purpose computer, such as a personal computer and an office computer, e.g., a microprocessor based microcomputer, is adapted to be connected to central controller unit 2 for establishing the intercommunication therebetween, host computer 1 being provided with a keyboard 89 and a CRT display means, as illustrated in FIG. 2. Incorporated in host computer 1 is an RS-232 serial interface, through which it communicates by bit serial format with its peripheral devices for the purpose of transmitting input data, such as a load control procedure accepted by keyboard 89, to central controller unit 2 and receiving output data from central controller unit 2 to display the corresponding information on the CRT. Central controller unit (hereinafter sometimes referred to as controller unit) 2 has the function of generating a set of output data signals, based on the data accepted directly through key switches SW incorporated therein or through host computer 1 and transmitting such output data signals sequentially and periodically to the respective terminal units 4 as time division multiplexing signals, each of the output data signals including at least an address, signal AD, a control signal LS, and a response waiting signal SS for receiving a corresponding response signal back from each terminal unit 4, as shown in FIG. 3. FIG. 3 also shows additional signals which may be used manually, SP for start pulse, CS for address bit start pulse, $PC_1$ and $PC_2$ for parity check. Central controller units 2 is basically composed of an RS-232C serial interface 5 for communicating with host computer 1, a processing section 6 composed, for example, of a microprocessor, a memory section 7 for storing a program operating processing section 6 and for storing data sent from each terminal unit 4 and host computer 1, a modem section 8 through which said output data signals and response signals are transmitted between controller unit 2 and each terminal unit 4, an input/output section 12, and a selection switch 13 for determining which of controller unit 2 or host computer 1 is utilized to operate the whole system. Input/output section 12 is mounted on the front panel of a housing accomodating controller unit 2 and comprises a switch board 10 with a cluster of key switches SW, by the operation of which central controller unit 2 will receive input data, such as a load control procedure when controller unit 2 is selected to operate the whole system, and a display board 45 for displaying each address allotted to an individual load during the operation of the above key switches designating such load, as well as for displaying a warning upon the occurrence of an unusual operation in the system. The selection switch 13 is normally switched to a position where controller unit 2 is under the control of host computer 1, so that processing section 6 can be responsive to the commands from host computer 1 to control the respective terminal units 4 and at the same time to send back the monitored data with respect to each terminal unit to host computer 1 for displaying such information on the CRT. Included among terminal units 4 are load terminal units $4_{01}$ for connecting and disconnecting the respective loads connected thereto, first monitoring terminal units $4_{11}$ for receiving data from various sensors such as burglar alarms, illumination level sensors, or the like and for transmitting such data as monitored data to central controller unit 2, and second monitoring terminal units $4_{21}$ for detecting accidental shorting across the wires of transmission line 3 and for monitoring local supply voltage applied to one or more power distribution boxes (not shown), in each of which at least load terminal unit $4_{01}$ is disposed together with second monitoring terminal unit $4_{21}$. Each of these terminal units to which a corresponding address is allotted reads continuous time division multiplexing output data signals from controller unit 2 and receives the particular control signal LS and response waiting signal SS, accompanied by its own address signal AD so as to be controlled by that control signal LS and response waiting signal SS in the following manner, that is, control signal LS for the load terminal unit $4_{01}$ will open or close corresponding load-switching circuits (details of which will be hereinafter described) to turn on/off the designated loads 14 connected thereto and each response waiting signal SS for each of the respective terminal units $4_{01}$, $4_{11}$ and $4_{22}$ will receive an individual response signal, which is representative of the response data sent back from each of the loads 14 to indicate the ON/OFF state of each load 14, the data sent back from the illumination level sensors or burglar alarms to indicate environmental condition, or the data indicating the state of the local supply voltage, all these response data being received in the respective terminal units 4 through monitored data transfer section 55 provided therein, and thereafter being transmitted as response signals to controller unit 2.

Figure 4:
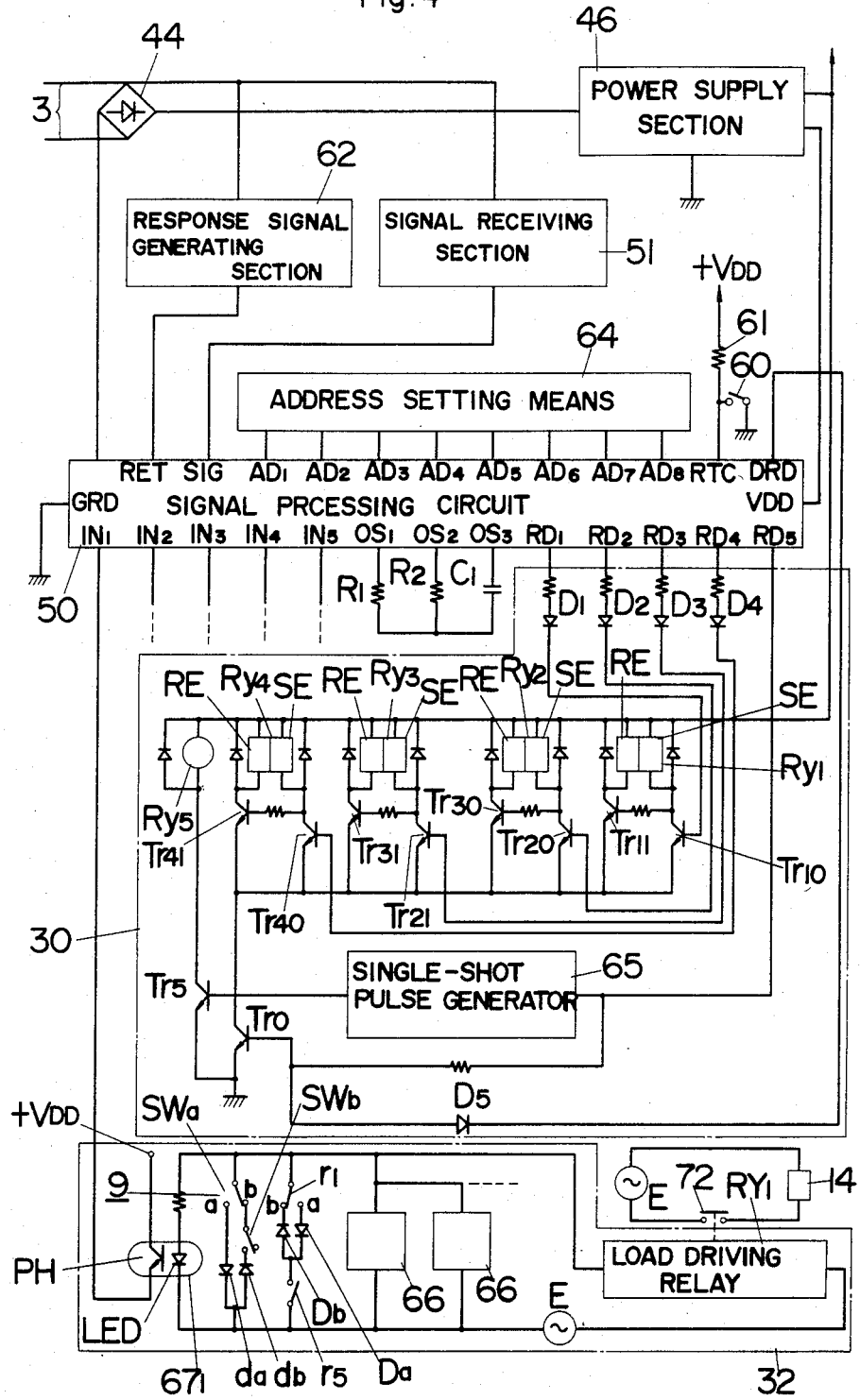
FIG. 4 is a somewhat schematic circuit diagram showing one terminal unit and a single load to be connected thereto.
Figure 6:
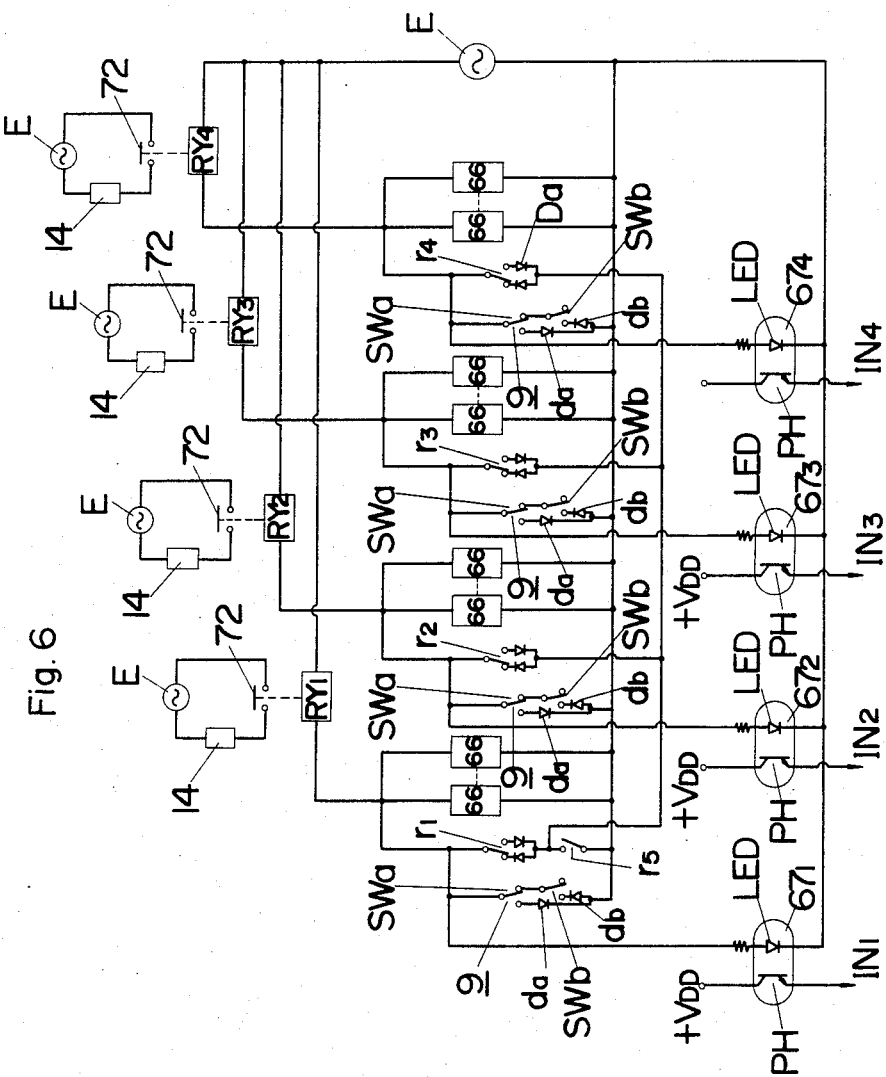
FIG. 6 is a circuit diagram showing a set of load-switching circuits which are connected to respective loads and which are incorporated within the terminal unit.

Although only the load terminal unit $4_{01}$ is shown in FIG. 4, each of terminal units $4_{01}$, $4_{11}$ and $4_{21}$ is provided with a signal processing circuit 50, composed of a single-chip microcomputer, a diode bridge 44 for providing full-wave rectification of the output data signals transmitted from controller unit 2 to obtain therefrom a DC voltage, which is then smoothed though a capacitor within a power supply section 46 so as to provide an electric power to this terminal unit through the voltage input terminals VDD and GRD of signal processing circuit 50, a signal receiving section 51 for passing the output data signals transmitted on transmission line 3 through an included wave-shaping circuit and presenting the resulting signals to a signal input terminal SIG in said signal processing circuit 50, a response signal generating section 62 for generating and transmitting to central controller unit 2 a response signal as a current signal under the control of signal processing circuit 50 by shorting a suitable impedance across the wires of transmission line 3 at every moment when said monitored data is received in the input terminals $IN_1$ to $IN_4$ of signal processing circuit 50 during the periods of transmitting the corresponding response waiting signal SS, and an address setting means 64 for imparting a specific address to this terminal unit. While, as best shown in FIGS. 4 and 6, each of the load terminal unit $4_{01}$ incorporates, in addition to the above elements, a plurality of load-switching circuits 32, the number of which is equal to the number of connectable loads 14 and each of which has one load driving relay (hereinafter referred to as load relay) $RY_1$ ($RY_2$, $RY_3$, $RY_4$), and a relay driving circuit 30 having intermediate relays $Ry_1$ to $Ry_4$ and common relay $Ry_5$, these two circuits (the detail structures of which will be hereinafter described) forming this terminal unit are to be connected to loads 14 and therefore to be called load terminal unit $4_{01}$.

Figure 5:
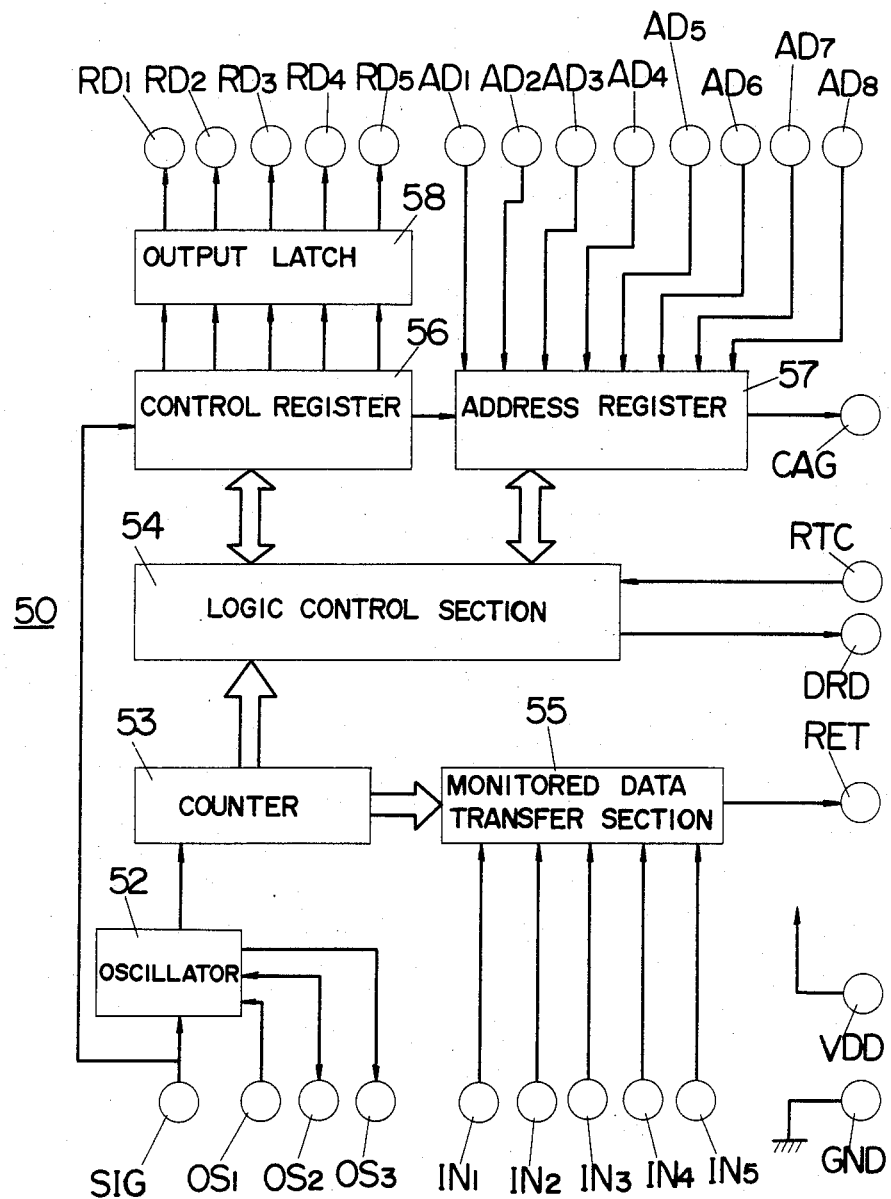
FIG. 5 is a block diagram showing the principal portion of the terminal unit.

The functional arrangement of signal processing circuit 50 is now discussed in detail with reference to FIG. 5, for the case when it is utilized in load terminal unit $4_{01}$, output data signals applied to SIG will go to an oscillator 52, which is arranged to produce a self-excited oscillation when the SIG voltage is at a high level and to cease such oscillation when it is at a low level. The frequency of self-excited oscillation is determined by constants for resistors $R_1$, $R_2$ and capacitor $C_1$ connected to terminals $OS_1$, $OS_2$ and $OS_3$. The output pulses from oscillator 52 are then delivered to a counter 53, which counts the output pulses and presents the resulting timing signals to both a logic control section 54 and the monitored data transfer section 55. Also included in signal processing circuit 50 are an address register 57, to which the output from address setting means 64 is applied through terminals $AD_1$ and $AD_8$, and which identifies the particular address signal allotted to this signal controlling circuit 50, a control register 56 for receiving the corresponding output control signal accompanied by such address signal, and an output latch 58 for holding the output from the control register 56 until such output operates relay driving circuit 30 included in load terminal unit $4_{01}$, the control and address registers 56, 57 being operated under the control of logic control section 54 to select the corresponding signals among the output data signals transmitted through transmission line 3, so as to obtain the resulting output signals at output latch 58 for operating relay driving circuit 30. Such output signals issued from output latch 58 are applied through terminals $RD_1$ to $RD_4$ to relay driving circuit 30 to actuate intermediate relays $Ry_1$ to $Ry_4$ of the latch-in type and common relay $Ry_5$ which, in turn, actuate the corresponding load relays $RY_1$ to $RY$, $RY_4$ in respective load-switching circuits 32 to turn on/off the respective loads 14. The terminal DRD, which is a control output terminal of signal processing circuit 50, is for delivering a timing pulse to actuate concurrently intermediate relays $Ry_1$ to $Ry_4$ in response to the contents of the data sent to terminals $RD_1$ to $RD_4$. The pulse width of this timing pulse is selected between, for example, 9 msec and 13 msec, depending on the response time of the intermediate relays to be employed, and such selection is effected by the use of a pull-up resistor 61 and a selection switch 60 to apply a high or low level voltage to terminal RTC. Monitored data transfer section 55 is provided to convert the monitored or response data sent to the input terminals $IN_1$ to $IN_4$ into a set of serial data and send them through terminal RET to response signal generating circuit 62, by which the serial data is transmitted back to the controller 2, as in the manner previously described.

In the meantime, terminal units other than load terminal units $4_{01}$ utilize input terminals $IN_1$ to $IN_4$ of signal processing circuit 50 for receiving data obtained by sensor means connected thereto and send such data on response signals to central controller unit 2. That is, the first monitoring terminals $4_{11}$ are employed to be coupled to various sensors, such as burglar alarms and illumination level sensors, so that they will receive the monitored data back from the sensors and send it to controller unit 2 by continuously transmitting such data as the response signals to controller unit 2, and second monitoring terminals $4_{21}$, having a shorting detector circuit (not shown) coupled to local electric supplies so that they will detect an accidental shorting in transmission line 3 as well as receive monitored data about the local supply voltages, and send these response data to controller unit 2.

Referring back to FIGS. 4 and 6, the detailed description of relay driving circuit 30 and load switching circuit 32 will follow. The intermediate relays $Ry_1$ to $Ry_4$, included in relay driving circuit 30, are respectively of the latch-in type, each having a set coil SE and a reset coil RE to move its change-over contact $r_1$ ($r_2$, $r_3$, $r_4$), constituting one part of load-switching circuit 32. The bases of respective transistors $Tr_{10}$, $Tr_{20}$, $Tr_{30}$, $Tr_{40}$ for set coils SE are connected to terminals $RD_1$ to $RD_4$ of signal processing circuit 50 respectively through diodes $D_1$ to $D_4$, and the base of transistor $Tr_5$ for operating the common relay $Ry_5$ is connected via a single-shot pulse generator 65 to a terminal $RD_5$, such that transistors $Tr_{10}$ through $Tr_{40}$ and $Tr_5$ are on when the corresponding terminals $RD_1$ through $RD_5$ are at a high level, common relay $Ry_5$ having a normally open contact $r_5$ also constituting one part of load-switching circuit 32. Transistors $Tr_{11}$, $Tr_{21}$, $Tr_{31}$, $Tr_{41}$ for reset coils RD are connected so as to be off when the corresponding transistors $Tr_{10}$ through $Tr_{40}$ for set coils SE are on, and vice versa. These transistors $Tr_{10}$ through $Tr_{40}$ and $Tr_{11}$ through $Tr_{41}$ are connected in series with transistor $TR_0$ in order to be driven only after transistor $Tr_0$ is driven in response to the terminal DRD being switched to a high level. Terminal DRD is connected through a diode $D_5$ to terminal $RD_5$, such that single-shot pulse generator 65 will issue a pulse at the instant when both terminals DRD and $RD_5$ are switched to a high level, enabling common relay $Ry_5$ to be actuated in advance of the intermediate relays $Ry_1$ to $Ry_4$. Thus, relays $Ry_1$ to $Ry_5$, incorporated in each load terminal unit $4_{01}$, are operated by remote control using the time division transmission signals from central controller unit 2.

Figure 7:
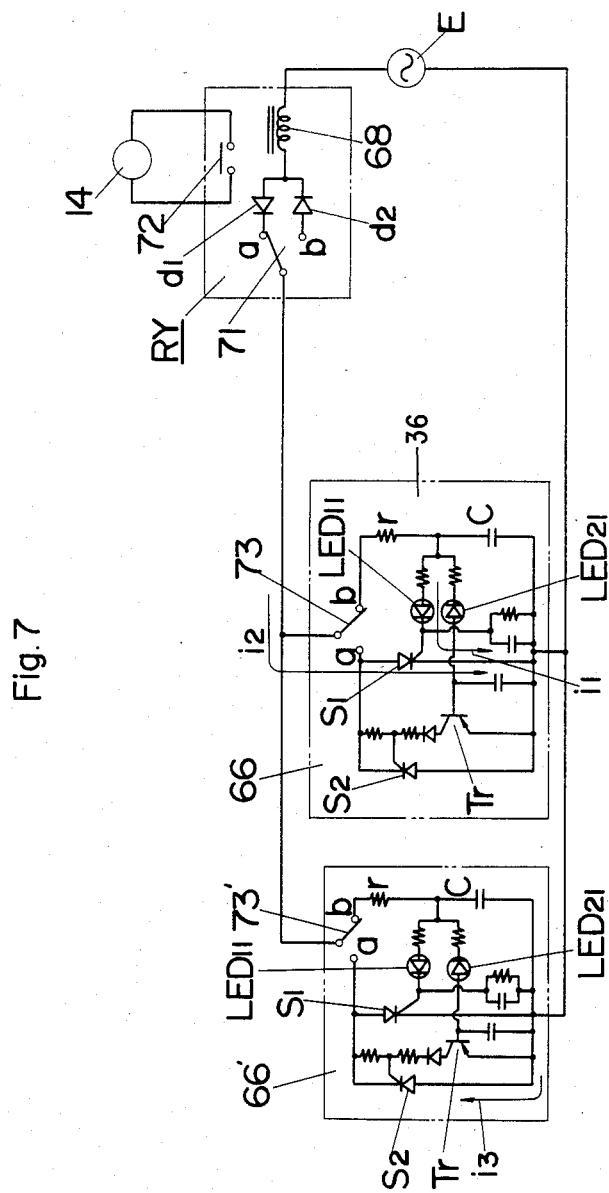
FIG. 7 is a circuit diagram showing a load driving relay actuated by the load-switching circuit to connect and disconnect a load, together with manual switch means having a momentary action switch and an operating circuit to drive the load-switching circuit.
Figure 8:
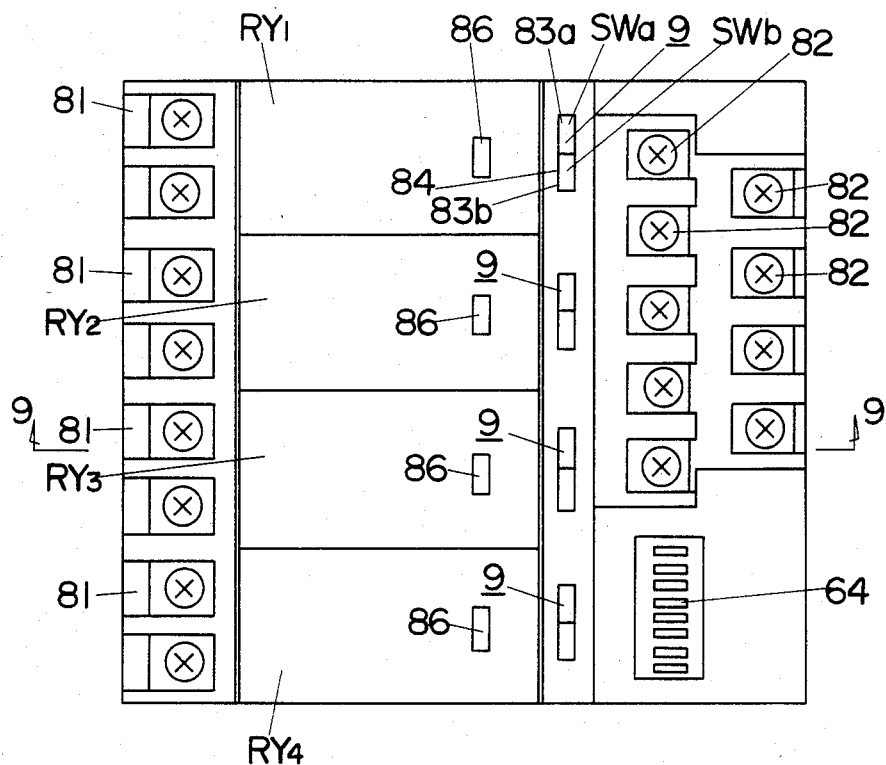
FIG. 8 is a plane view of the terminal unit employed in the present invention.
Figure 9:
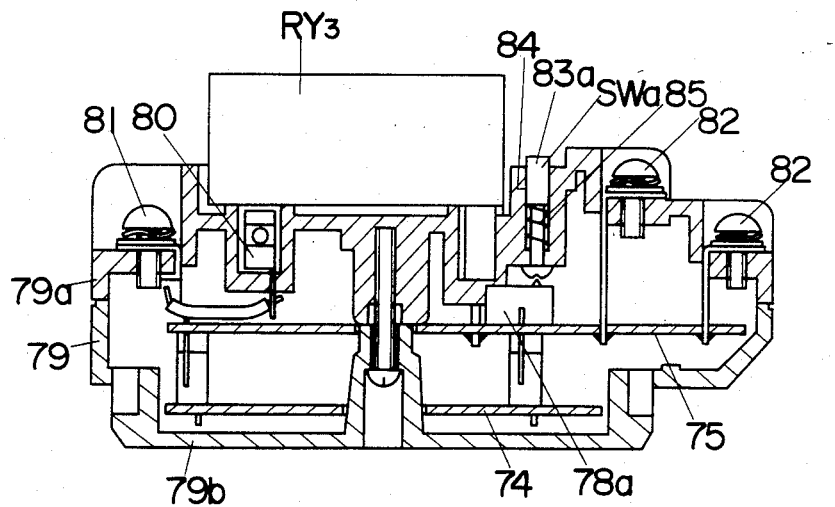
FIG. 9 is a sectional view taken along line 9-9 of FIG. 8.
Figure 10:
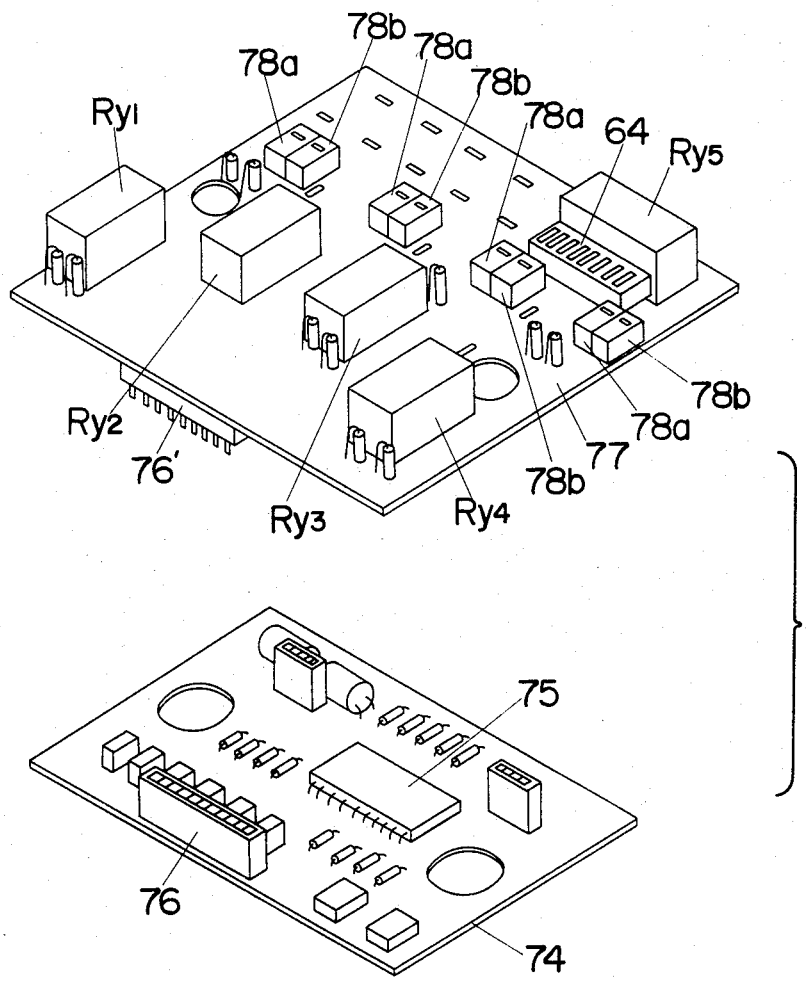
FIG. 10 is an exploded perspective view showing the interior parts accomodated in the terminal unit.
Figure 11:
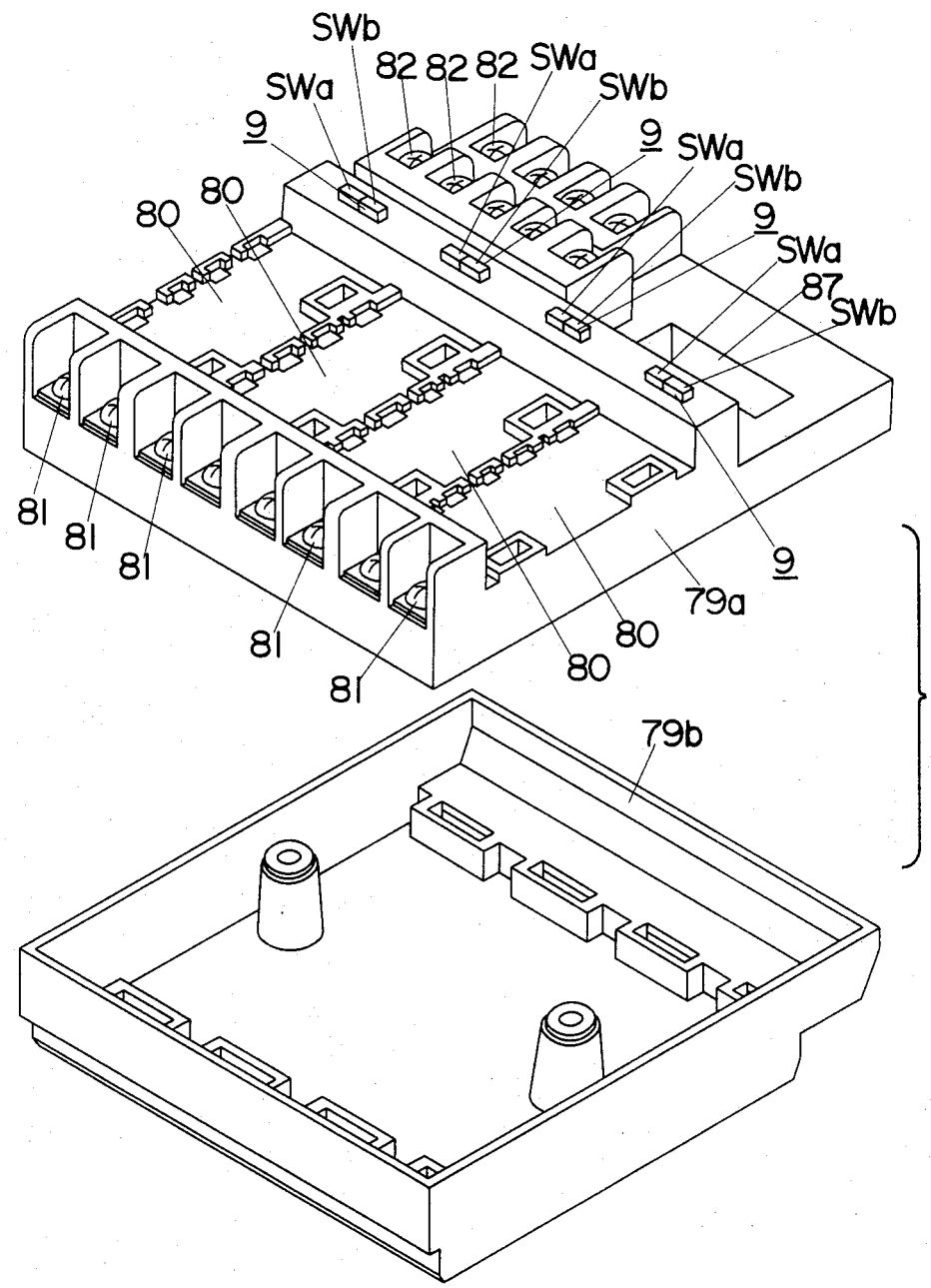
FIG. 11 is an exploded perspective view showing the case of the terminal unit.

The relay driving circuit 30 responds to the instruction from controller unit 2 to drive the load-switching circuits 32, also incorporated in the same load terminal unit $4_{01}$, in number corresponding to the intermediate relays. FIG. 4 shows a single load-switching circuit 32 in relation to one load terminal unit $4_{01}$ for reasons of convenience, whereas all the load-switching circuits 32 per one load terminal unit $4_{01}$ are shown in FIG. 6. Each load-switching circuit 32 is basically composed of the load relay $RY_1$ ($RY_2$, $RY_3$, $RY_4$) of the latch-in type for connecting and disconnecting the corresponding load 14, reversing switch means 34 composed of changeover contact $r_1$ ($r_2$, $r_3$, $r_4$) of the corresponding intermediate relays $Ry_1$ ($Ry_2$, $Ry_3$, $Ry_4$) and normally open contact $r_5$ of the common relay $Ry_5$, manual switch means 9 and 66 connected in parallel with reversing switch means 34, and a photocoupler monitor means $67_1$ ($67_2$, $67_3$, $67_4$). Each of load relays $RY_1$ to $RY_4$ includes, as shown in FIG. 7, a main contact 72 for turning on/off the individual load 14, a changeover contact 71 with two fixed contact members and one movable contact member, and a coil 68 which is energized by current flowing through load-switching circuit 32 to move these two contacts 71 and 72 concurrently. In the following description, the changeover contact of each load relay $RY_1$ ($RY_2$, $RY_3$, $RY_4$) is referred to as first changeover contact, whereas that moved by each intermediate relay $Ry_1$ ($Ry_2$, $Ry_3$, $Ry_4$) and constituting each reversing switch means 34, is referred to as second changeover contact to distinguish one from the other. The load relay RY is a magnetic latch-in relay which moves each of the main and first changeover contacts from one position to the other upon receiving a current flowing in one direction and assumes the last position until it receives a current in the opposite direction, such contact positions being maintained by the incorporated permanent magnet holding the armature in position so as to require no further continuous current in the same direction. Two fixed contact members of first change-over contact 71 are connected in load-switching circuit 32, respectively, by two first diodes $d_1$ and $d_2$ of opposite polarity for alternately connecting either of the two diodes to allow the current in load-switching circuit 32 to flow in the respective forward directions. The arrangement of first changeover contact 71 and two diodes $d_1$ and $d_2$ is cooperative with reversing switch means 34 or the manual switch means 9 and 66 operates, such that closing the load-switching circuit 32 by the reversing switch means or the manual switch means will cause current to flow in one direction in the circuit 32 to actuate the load relay RY and at the same time prevent further current flow through circuit 32 while it remains ready for flowing current in the opposite direction at the next closure of the circuit. The reversing switch means 34 is connected between an AC power source E and load relay RY, with two fixed contact members of second changeover contact $r_1$ ($r_2$, $r_3$, $r_4$) being connected in the circuit 32, respectively, by two second diodes $D_a$ and $D_b$ of opposite polarity and with normally open contact $r_5$ being connected in series with second changeover contact $r_1$. Since second changeover contact $r_1$ ($r_2$, $r_3$, $r_4$) and normally open contact $r_5$ are driven respectively by intermediate relays $Ry_1$ ($Ry_2$, $Ry_3$, $Ry_4$) and common relay $Ry_5$, as previously stated, reversing switch means 34 responds to the control signal from central controller unit 2 to alternatively connect either of two second diodes $D_a$ and $D_b$, causing the current in the circuit 32 to flow in the corresponding direction to actuate the load relay Ry to connect and disconnect the load 14. At this time, the first changeover contact 71 of load relay RY is also reversed to prevent further current from flowing in the same direction and to be ready for allowing the current in the opposite direction to reverse the load state at the next operation of reversing switch means 34 due to the combined effect of first and second diodes $d_1$, $d_2$, $D_a$ and $D_b$. The above function will be easily understood from FIGS. 4 and 6 when considered in conjunction with FIG. 7. When the load terminal unit $4_{01}$ receives the control signal from central controller unit 2 to connect the designated load 14, it will close normally open contact $r_5$ first and actuate set coil SE of the corresponding intermediate relay $Ry_1$ ($Ry_2$, $Ry_3$, $Ry_4$) to close the contact "a" of second changeover contact $r_1$ ($r_2$, $r_3$, $r_4$), causing a current in load-switching circuit 32 to flow in the counterclockwise direction through diodes $D_a$ and $d_1$ so as to close main contact 72 of load relay RY and simultaneously reverse first changeover contact 71, whereby further current in the counterclockwise direction is blocked by the two diodes $D_a$ and $d_2$ now arranged in opposite polarity. As soon as sufficient current flows in that direction to connect the load 14, normally open contact $r_5$ is closed by the function of common relay $Ry_5$ to prevent undesirable current which would otherwise flow through $D_a$ when manual switch means 9 or 66 is manipulated subsequently to reverse the same load relay RY so as to again conduct diode $d_1$ of the same polarity $D_a$, preventing the malfunction of load-switching circuit 32 at the time of operating manual switch means 9 or 66. On the other hand, when load terminal unit $4_{01}$ receives the control signal from central controller unit 2 to disconnect the load 14, it will likewise close normally open contact $r_5$ and actuate reset coil RS of the corresponding intermediate relay $Ry_1$ ($Ry_2$, $Ry_3$, $Ry_4$) to close the contact "b" of second changeover contact $r_1$ ($r_2$, $r_3$, $r_4$), causing a current in load-switching circuit 32 to flow in the clockwise direction through diode $D_b$ and $D_2$ so as to open main contact 72 of load relay RY and simultaneously reverse first changeover contact 71 and open the contact $r_5$, in the same way as described above.

As shown in FIG. 4, each load-switching circuit 32 is provided with, as the manual switch means connected in parallel with the reversing switch means 34, a single first manual switch means 9 and a pair of second manual switch means 66. First manual switch means 9 is accomodated in the housing of load terminal unit $4_{01}$ and second manual switch means 66 are located near the corresponding load 14, such as by being mounted on a wall. Each first manual switch means 9 includes an on-switch SWa having a first transfer contact and an off-switch SWb having a normally open contact, both being of the momentary action type. The normally open contact "a" of on-switch SWa is connected in load-switching circuit 32 through a third diode $d_a$ so that the current flows in the direction of connecting the load 14 when thrown to this normally open contact a. The normally closed contact b of on-switch SWa is connected in the circuit 32 through a fourth diode $D_b$ and the off-switch SWb, in such a way that the closure of this off-switch SWb causes a current in the circuit 32 to flow in the direction of disconnecting the load 14. With this arrangement of the first manual switch means 9, it is possible to actuate the load relay RY independently of the reversing switch means 34 to turn the load 14 on and off simply by manipulating on-switch SWa and off-switch SWb, respectively. Also with this arrangement of first manual switch means 9, simultaneous throw-in of on-switch SWa and off-switch SWb will allow the current only through third diode $d_a$, while off-switch SWb is held at cutoff so as to operate the load relay RY in the direction of connecting the load 14.

Referring to FIG. 7, each of second manual switch means 66, connected in parallel with reversing switch means 34 and the first manual switch means 9, comprises a single momentary action switch device 73, having a second transfer contact with an NO contact "a", as well as an NC contact "b", and an operating circuit 36 to be driven by the momentary action switch device 73 at either of two contact positions. Operating circuit 36 includes a series combination of a resistor R and a capacitor C connected in series to the NC contact "b", and the parallel combination of two SCR's $S_1$ and $S_2$ of opposite polarity and connected in series to said NO contact "a" to apply a voltage stored in capacitor C to each gate of SCR $S_1$ and $S_2$ when NO contact "b" is conducting, the gate of SCR $S_1$ being connected through a first light emitting diode $LED_1$ to the connection point between resistor R and capacitor C, while the gate of SCR $S_2$ is connected to the output terminal of a transistor Tr, the gate of which is connected through a second light emitting diode $LED_2$ to the connection point between the resistor R and the capacitor C. The operation of this second manual switch means 66 is discussed with reference to FIG. 7, which shows the load-switching circuit 32 in its open condition. When switch 73 in one of second manual switch means 66 is switched to NO contact "a", capacitor C, which has been charged, will flow a current $i_1$ through $LED_1$ to the gate of SCR $S_1$, which then triggers $SCR_1$ to flow sufficient current in load-switching circuit 32 through diode $d_1$ and coil 68 of load relay RY to actuate the relay RY for connecting the load 14. Concurrently with this current flow, relay RY reverses its first changeover contact 71 so that no further current will flow in the circuit 32, in the same manner as that which occurs with the first manual switch means 9. Accordingly, continuous holding of this switch device 73 in the above contact position will have no effect upon the operation of load relay RY and the next operation for reversing the load relay RY 14 may be conducted by returning this switch device 73 and again switching to NO contact "a" or by switching another second manual switching means 66 before the above switch device 73 moves back to a free position (NC position) from an operating position (NC position). In both cases, the corresponding SCR $S_2$ is triggered by the current through the corresponding $LED_{21}$ to provide a sufficient current flow $i_3$ to actuate load relay RY until first changeover contact 71 of load relay RY is reversed. It is noted from the above, $LED_{11}$ will emit a light when the current begins flowing in the direction corresponding to connection of the load 14, while $LED_{21}$ will emit light when current begins flowing in the direction corresponding to disconnection of the load 14, so that an operator can be informed of whether the load 14 is turned on or off by such emission of light. $LWD_{11}$ and $LED_{12}$ may, of course, be replaced by conventional diodes. In this embodiment, wherein more than one second manual switch means 66 connected in parallel with said reversing switch means 34 are introduced in load-switching circuit 32, there will be no trouble, such as chattering or the like, in operating the load relay RY, even if one second manual switch means 66 is switched, while the other second switch means 66 remains in operation. These features will be most available where it is required to control lighting fixtures by, in addition to a central controller unit, a large number of local switches fixed in different locations. The above second manual switch 66 is adapted to be connected to the load terminal unit $4_{01}$ by a pair of wires, so as to be located near the load 14, for example, to be mounted on a wall.

The photocoupler monitor means $67_1$ ($67_2$, $67_3$, $67_4$), included in each load-switching circuit 3, has a significant role in the present invention for detecting the on-/off state of the load 14 and transmitting a response signal representative of such state to central controller unit 2, which should be required to acknowledge such condition, irrespective of whether load relay RY or load 14 is operated by the instruction from controller unit 2 or by manual switch means 9, 66. Each photocoupler means 67 comprises a pair of a light emitting diode LED and a photodetector PH. The LED is connected in parallel with the reversing switch means 34 and manual switch means 9 and 66 to emit a light each time the current in the load-switching circuit 32 flows in the direction of connecting the load 14, while PH is connected to the input terminal $IN_1$ ($IN_2$, $IN_3$, $IN_4$) of signal processing circuit 50 to send a signal indicative of the emission of light to signal processing circuit 50, which in turn transmits a corresponding response signal representative of load state to controller unit 2. With this arrangement, photocoupler means 67 can always monitor load-switching circuit 32 and detect every current flowing in the direction of connecting the load 14, irrespective of whether it is induced by the reversing switch means 34, first manual switch means 9, or second manual switch means 66. This enables the load 14 to be operated directly by manual switch means 9 and 66 at locations near the corresponding loads 14 without reverting to central controller unit 2.

In the meanwhile, each of the second monitoring terminal unit $4_{21}$ incorporates a shorting detector circuit (not shown) which actuates a relay with one or more normally closed contacts 88 inserted serially in transmission line 3 at the location behind the connecting point to that terminal under $4_{21}$, as shown in FIG. 1. Each shorting detector circuit will actuate the relay upon detecting a short in any location in transmission line 3 to open the contacts 88 so as to disconnect all the terminal units behind those contacts 88. While at the same time, the central controller unit 2 also detects the occurrence of shorting in transmission line 3 by its own detecting means (not shown), and subsequently begins to access all the second monitoring terminal units $4_{21}$ in the order of the nearest to controller unit 2 to close the contact 88 once opened of the accessed terminal unit $4_{21}$, while the contacts 88 of the other terminal units $4_{21}$ behind the terminal unit $4_{21}$ now accessed remains open in such a way as to determine whether the detecting means in controller unit 2 again detects the shorting or not, whereby the detection of the shorting by the detecting means at the time of accessing the particular second monitoring terminal unit $4_{21}$ is understood to prove that the shorting has occurred at the location behind that terminal unit $4_{21}$. In this way, second monitoring terminal units $4_{21}$ cooperate with controller unit 2 to determine the location of shorting in transmission line 3 by successively performing the above operations. The occurrence of this shorting in transmission line 3 is also displayed on a CRT of host computer 1 when selection switch 13 is switched to the position for combining host computer 1 with controller unit 2 or is indicated by a corresponding $LED_5$ on the front panel of controller unit 2 when selection switch 13 is switched to the opposite position. Each second monitoring terminal unit $4_{21}$ has another function of monitoring the local supply voltage supplied to the respective terminal units gathered together with this terminal unit $4_{21}$ in one power distribution box (not shown) and for sending the monitored data back to controller unit 2 and/or host computer 1. The monitored data, if there is insufficient or no voltage supplied to any of the terminal units, is indicated by the lighting of a corresponding $LED_7$ on controller unit 2 or by a display on the CRT of the host computer, depending on the position of the selection switch 13. The occurrence of a break in transmission line 3, on the other hand, can be detected at the moment when controller unit 2 receives no response data signal from any of the terminal units and is indicated by the lightning of a corresponding $LED_6$ on controller unit 2 or by a display on the CRT of host computer 1. In the attached drawings, only three types of terminal units $4_{01}$, $4_{11}$ and $4_{21}$ are disclosed, however, another terminal unit of the type for monitoring analog data, for example, temperature, may be adapted to this system. Included in this terminal unit is means which receives monitored data in analog representation from a suitable sensor connected to that terminal and converts the analog data into digital data of a plurality of binary coded digits, each digit corresponds to each bit of the control signal composed of five bits transmitted from controller unit 2 and is delivered successively to the signal processing circuit 50 of that terminal unit each time that terminal receives a control signal. Accordingly, the complete monitored data is received in the signal processing circuit 50 in five cycles of the control signals and is then sent back to controller unit 2.

Figure 12:
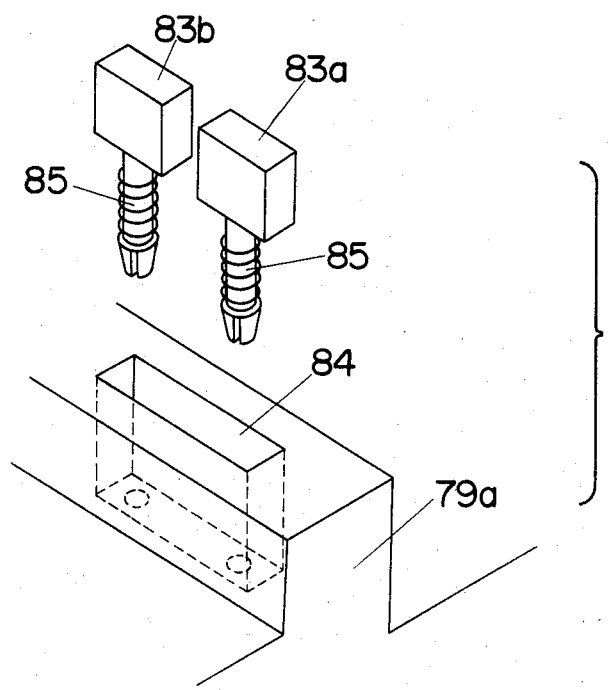
FIG. 12 is a perspective view showing one example of a push button provided in the terminal unit to actuate the load-switching circuit.

Turning to FIGS. 8–12, there is shown an example of the mechanical structure for load terminal unit $4_{01}$ employed in the present invention. A printed circuit board 74 carries thereon an LSI circuit, constituting signal processing circuit 50, various components, such as resistors and capacitors, forming the functional blocks other than relay driving circuit 63 and load-switching circuit 32, and a female connector 76a projecting upwardly from one end thereof. Another printed circuit board 77 carries thereon intermediate relays $Ry_1$ to $Ry_4$ and common relay $Ry_5$, microswitches 78a and 78b, which are used respectively as the on-switch SWa and off-switch SWb of first manual switch means 9, and the diodes constituting load-switching circuit 32. A male connector 76b projecting downwardly from one end of keyboard 77 is engaged with female connector 76a to simplify the wiring between the circuits on the sides of the controller unit 2 and the load-switching circuit 32. Also on printed circuit board 74 is mounted a DIP-type switch for address setting switch 64. These printed circuit boards 74 and 77 are accommodated in a housing 79 of load terminal unit $4_{01}$, with the former above the latter to reduced wiring space, making it possible to minimize the dimension of this terminal unit $4_{01}$. The upper printed board 77 has a conductive pattern which is devised to provide a shielding effect, whereby the noise occurring when operating the relays on the upper board 77 is prevented from entering the circuit on the lower board 74, preventing malfunction of the system. The housing 79 is composed of a main body 79a and a bottom cover 79b. The main body 79a is provided on its upper surface with sockets 80 for detachably receiving the respective load relays $RY_1$ to $RY_4$ terminals, of which are electrically connected through sockets 80 to the upper board 77 to complete load-switching circuits 32 in the load terminal unit $4_{01}$. Mounted on one side of the housing 79 are a series of high voltage terminals 81 which are used for connection to commercial power lines and load lines leading to the loads 14 being controlled. Mounted on the other side of the housing 79 are a series of low voltage terminals 82, for connecting load voltage power lines supplying a low voltage lowered by a suitable step-down transformer to load-switching circuits 32 and for connecting shielding double-core cables, which are the signal transmitting wires leading to the various types of sensors or the like. Pairs of push buttons 83a and 83b are received within respective square openings 84 in the top wall of housing 79 to actuate the corresponding microswitches 78a and 78b, i.e., on-switches 78a and off-switches 78b arranged in pairs on the upper board 77. As illustrated in FIG. 12, each of push buttons 83a and 83b has a leg which extends through the bottom of the square opening 84 to abut on the actuator, or plunger of the corresponding microswitch and is biased upwardly by a spring 85, so that each microswitch is actuated manually by pressing the corresponding push button against the biasing force of the spring 85. Square openings 84 are disposed at locations between the low voltage terminals 82 and the load relays RY to keep the fingers of an operator manipulating push buttons 83a and 83b away from the high voltage terminals 81, preventing the operator from receiving an electric shock therefrom. Each of the load relays RY mounted on the upper surface of housing 79 is encapsulated in a case, having on its upper face a window 86 through which the contact position or any indicator associated therewith can be viewed by the operator. This enables the operator to readily confirm the state of load relay RY and eliminates the necessity of any other indicator means in the terminal unit. The address setting switch 64 on the upper board 77 is exposed through a slot to the upper surface of the housing 79 for an easy setting operation.

Figure 13:
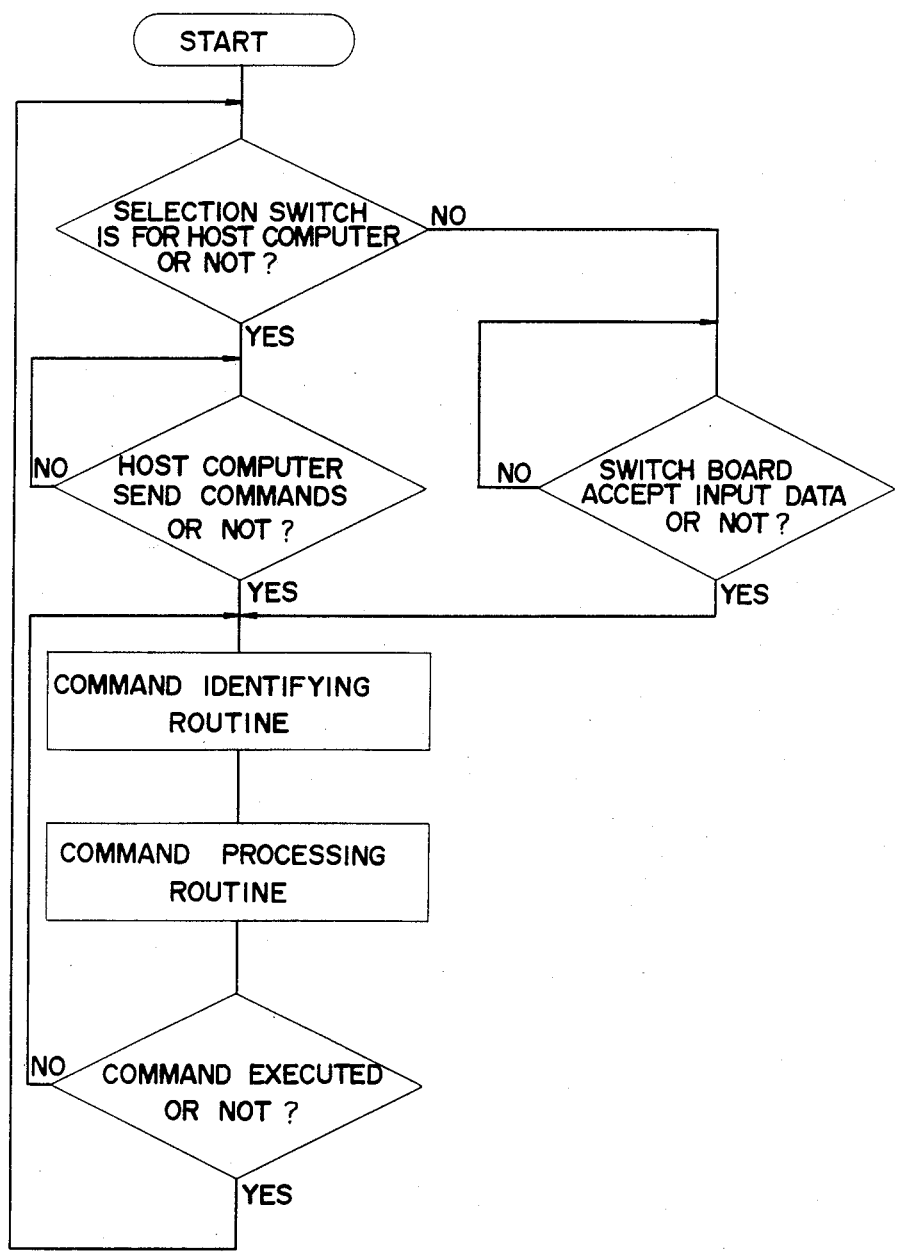
FIG. 13 is a flow chart showing the operating sequence of a program executed between the host computer and the central controller unit.

The operation of the present time division multiplexing load control system will now be described with reference to FIG. 13. The central controller unit 2 is initialized upon turning on the power to interrogate which of the positions is selected by selection switch 13, that is, the position for operating central controller unit 2 under the control of host computer 1 or the position for operating controller unit 2 without host computer 1. When selection switch 13 is switched to the former position, controller unit 2 is set to be ready for accepting commands from host computer 1 and not for accepting input data through the key switches SW of controller unit 2, while it is set to be ready for accepting the input data through key switches SW and not for accepting the commands from host computer 1 when switched to the latter position.

The host computer 1, when communicated with controller unit 2 by the above selection switch 13, will deliver to controller unit 2 the following three kinds of commands accepted through the attached keyboard 89 with alphanumeric keys, these three commands being "S1", "T1" and "W1". Command "S1" is employed for entering in the controller unit 2 the types of terminals to which the individual addresses are allotted, such command "S1" is followed by a series of two hexadecimal digits designating the individual address and a digit designating the type of the specific terminal unit coincident with said address. For example, "S1010" indicates the address of terminal unit by the middle two digits "01" in hexadecimal notation and the type of that terminal by the last digit "0". In the present embodiment, the last digit "0" is for designating the load terminal unit $4_{01}$ "1" for first monitoring terminal unit $4_{11}$ and "2" for second monitoring terminal unit $4_{21}$. Thus, if host computer 1 accepts "S1010" through keyboard 89, it converts it into the corresponding ASCII code which is then delivered through serial interface 5 to controller unit 2, while at the same time it is displayed as input data on the CRT. Upon receiving the input data from host computer 1, the processing section 6 of controller unit 2 identifies the command "S1" and decides the data accompanied thereby to be for the address allotted to a particular terminal unit and for the type of that terminal unit, the data thus processed is registered or stored in the memory 7 of controller unit 2, which will recognize any further address data "01" accompanied by any of the above commands as designating the load terminal $4_{01}$. Once the input data, with respect to each one terminal unit, is stored in controller unit 2, it will commence transmitting output data signals to the terminal unit, and accessing the respective ones of terminal units periodically in the ascending order of the address number, which increasing number of the terminal units thus registered in controller unit 2. The above access operation is performed independently of the instruction from host computer 1. During the access to first monitoring terminal unit $4_{11}$, the response data successively sent back from that controller unit is written to memory 7 to renew and hold the stored data therein, and during the access to load terminal unit $4_{01}$, the response data indicating the on/off state of the load 14 is written to memory 7 for storage. In this manner, controller unit 2 operates upon receiving the data with respect to the address and type of terminal units to access the respective ones of terminal units and hold the response data with respect to each terminal unit in the location corresponding to its address. Command "T1" is employed for providing controller unit 2 with the instruction to control the load 14 connected to the load terminal unit $4_{01}$. This command "T1" is followed by a series of two hexadecimal digits designating the individual address and a hexadecimal digit representing the control data for the terminal unit with that address. For example, "T100A" indicates the address of load terminal unit by the middle two digits "00" in hexadecimal notation and the type of that terminal by the last digit "A" in hexadecimal notation. In the meanwhile, each load terminal $4_{01}$ of the present embodiment is designed for connecting up to four loads, to each of which is allotted a single bit for control data, accordingly the first four digits in each of said control signals transmitted from controller unit 2 and addressed to one load terminal unit $4_{01}$ represent the control data for the respective loads, wherein "0" digit is the signal for disconnecting the load and "1" digit is used for connecting the load. The last one hexadecimal digit accompanied by the commands "T1" corresponds to the above four binary digits, that is, "A" is for "1010". Thus, the above example "T100A" is understood to be the instruction to present to load terminal unit $4_{01}$, the control signal "1010" by which the first and third loads are to be connected, while the second and the last loads are to be disconnected. Upon receiving input data from host computer 1, controller unit 2 orders processing section 6 to decide whether the terminal unit designated by the above address "00" has been registered in the memory as the load terminal unit $4_{01}$ or not, so that it will transmit a resulting control signal prepared from control data during the access to load terminal unit $4_{01}$ when the above decision is "YES" and it will refuse to accept the instruction from host computer 1 when the decision is "NO". The last command "W1" is employed for checking the on/off state of the load 14 connected to load terminal unit $4_{01}$ and response data back from first and second monitoring terminal units $4_{11}$ and $4_{21}$, and is entered in host computer 1 with the subsequent numerals, such as in the form of "W100", in which the last two numerals "00" designate in hexadecimal notation the address of the corresponding terminal unit, which is actually the load terminal unit $4_{01}$, as apparent from the above description. Controller unit 2 responds to this input data on the side of host computer 1 to read the most recent data sent back from the designated load terminal unit $4_{01}$, whose address is "00", and stored in the memory while providing access to all the terminal units, and then delivers such data to host computer 1 so as to display it on the CRT, for example, in the form of "M100A", in which "M1" is a prefix code to show the subsequent digits on the CRT as indicating the monitored data with respect to controllable articles, such as loads, sensors or the like, connected to the terminal unit, a set of middle two digits "00" designates in hexadecimal notation the address allotted to the corresponding terminal unit, and the last digit "A" designates in hexadecimal notation the state of the controllable article. The last digit "A" corresponds to "1010" in binary digits, therefore, in this instance of the load terminal unit $4_{01}$ being checked, it is known from the above data, beginning with "M1" displayed on the CRT, that the first and third loads 14 connected to the load terminal unit $4_{01}$, whose address is "00" in hexadecimal notation, are on, while the second and last loads 14 connected to the same are off. In this manner, all the controllable articles, including loads, sensors or the like, can be checked by host computer 1 and the data with respect to the state of each article can be displayed on the CRT of host computer 1.

In the meanwhile, host computer 1 is cooperative with central controller unit 2 to establish a further operational relationship therebetween, which will now be described. Host computer 1 can instruct controller unit 2 to examine any error which occurred between controller unit 2 and each of the controllable articles connected to the individual terminal units and, at the same time, to send back information about such error so that it can be displayed on the CRT of host computer 1, and also host computer 1 can display on the CRT the address and the type of the terminal unit responsible for such error, as well as clear the data indicating the occurrence of that error from the memory of controller unit 2 when that error has been corrected. Another function which host computer 1 can perform is to register the terminal units in groups, each of which has one or more terminal units connected to loads, sensors or the like, controllable articles all located in the same application spots, and to display on the CRT the types, as well as the control and response data with respect to those terminal units group-by-group, or spot-by-spot. Further, host computer 1 is capable of initializing controller unit 2, displaying on the CRT the kinds of applicable commands to controller unit 2, and interrupting the transmission of output data signals from controller unit 2 to terminal units.

On the other hand, when central controller unit 2 is brought into such operational condition by said selection switch 13 to accept input data only through the key switches SW on switch board 10, the key-in operation through the above key switches SW will effect entering in controller unit 2 the types of terminal units to which the individual addresses are allotted, providing controller unit 2 with the instruction to control the loads 14 connected to load terminal unit $4_{01}$, and checking the on/off state of the load 14 connected to load terminal unit $4_{01}$, as well as response data back from first and second monitoring terminal units $4_{11}$ and $4_{21}$. In this condition, switches $SW_A$, $SW_B$ and $SW_C$, which are function keys, are utilized for respectively providing the same commands as "S1", "T1" and "W1", described hereinbefore, to set controller unit 2 ready for accepting the corresponding input data through the following key switches. These commands, which are identical to those issued from host computer 1, will be delivered to the processing section 6 of controller unit 2. Switches $SW_{AD1}$ to $SW_{AD3}$ are for entering the address of the respective terminal units in decimal numerals, each switch corresponding to each digit of address numbers and each address thus entered being displayed on display section 45 at each key-in operation. Switches $SW_1$ to $SW_4$ on switch board 10 are respectively for entering the types of terminal units $4_{01}$, $4_{11}$ and $4_{21}$, the last one being introduced for auxiliary terminal unit, such as for the terminal unit for monitoring analog data, as previously mentioned, or a load terminal without said manual switch means (not shown in the present embodiment). Switches $SW_5$ to $SW_8$ are for providing control signals, each in four bits. Switch $SW_R$ is a reset switch for initializing controller unit 2. As is discussed in this paragraph, central controller unit 2 can alone be used for presenting the control data to each terminal unit, as well as for identifying the response data therefrom, as in the same manner utilizing host computer 1. FIG. 2 shows other accessories mounted on the front panel of controller unit 2. Included therein are $LED_1$ to $LED_4$ for indicating by emission of light the response data for each terminal unit just called by entering one of the commands, followed by address designating this terminal unit, the response data carrying the states of respective controllable articles connected to that terminal unit and each state being indicated by each LED. Also mounted are $LED_5$ emitting a light when shorting has occurred in transmission line 3 between controller unit 2 and any of terminal units, $LED_6$ emitting a light when transmission line 3 is broken, $LED_7$ emitting a light when any of the local power supplies fails to provide a sufficient power to the corresponding terminal unit, $LED_8$ emitting a light when there appears an error in any of the response signal from each terminal unit to controller unit 2, and $LED_9$ emitting a light when there is an error in a key-in operation by the above key switches SW, these $LED_5$ to $LED_9$ being provided to issue a warning of an unusual operation.

The above description, and particularly the drawings, are set forth for purposes of illustration only. It will be understood that many variations and modifications of the embodiment herein described will be obvious to those skilled in the art, and may be carried out without departing from the spirit and scope of the invention.

We claim:

1. A time division multiplexing load control system, comprising:

a central controller unit for generating, based upon input data accepted through an incorporated input device, output data signals, each of which includes at least an address receiving a response signal; and a plurality of terminal units connected to the central controller unit, said central controller unit transmitting said output data signals sequentially and periodically to respective ones of said terminal units, each terminal unit responding to a corresponding address signal which accompanies each control signal and receiving said control signal to be controlled thereby and transmitting a response signal to the central controller unit in accordance with the control signal and the response-waiting signal, said output data signals and response signals being transmitted as time division multiplexing signals between the central controller unit and each of the terminal units;

at least one of the terminal units being provided with one or more associated load-switching circuits defining the associated terminal unit as being connected to one or more loads, each load-switching circuit comprising:

a latch-in load driving relay having a main contact for connecting and disconnecting the load and having a first changeover contact, two first contact members which are connected in said load-switching circuit respectively between said first changeover contact and two first diodes of opposite polarity which alternatively conduct to allow current to flow in a respective direction in said load-switching circuit;

reversing switch means connected between an AC power source and the load driving relay and having a second changeover contact, two second fixed contact members which are connected in said load-switching circuit respectively between said second changeover contact and two second diodes of opposite polarity for responding to the control signal from the central controller unit to alternatively cause the conduction of said two second diodes to allow current to flow in a respective direction in said load-switching circuit;

manual switch means connected in parallel with said reversing switch means for operating said load-switching circuit independently of the function of said reversing switch means; and a photocoupler detecting means including a light emitting diode connected in parallel with said current reversing switch means for emitting light in response to the current flowing in one direction in said load-switching circuit, and a photodetector which detects the emission of light and transmits a response signal representative of such emission to the central controller unit;

said load driving relay being responsive to a forward current flow through either of the two first diodes to move said main contact for connecting and disconnecting the load and at the same time to move the first changeover contact from one position to another position;

said reversing switch means futher including a normally open contact connected in series with said second changeover contact, both the normally open contact and the second changeover contact being controlled by said control signal from the central controller unit in such a way that the second changeover contact moves subsequent to the closing of the normally open contact and is kept latched in its last position, whereby said second changeover contact when moving to either of two positions thereof in response to the control signal causes a current to flow in either of two directions in said load-switching circuit through the first and second diodes which are arranged in the same direction until the first changeover contact is reversed by said current to prevent further current flow, said manual switch means further comprising a switch device for causing a current in the load-switching circuit to flow in a direction so as to actuate the load driving relay for turning on the load and for causing a current in the same circuit to flow in a opposite direction so as to actuate the load driving relay for turning off the load.

2. A time division multiplexing load control system, comprising:

a central controller unit for generating, based upon input data accepted through an incorporated input device, output data signals each of which includes at least an address signal, a control signal, and a response-waiting signal for receiving a response signal; and a plurality of terminal units connected to the central controller unit, said central controller unit transmitting such output data signals sequentially and periodically to respective ones of said terminal units, each terminal unit responding to a corresponding address signal which accompanies each control signal and receiving said control signal to be controlled thereby and transmitting a response signal to the central controller unit in accordance with the control signal and the response-waiting signal, said output data signals and response signals being transmitted as time division multiplexing signals between the central controller unit and each of the terminal units;

at least one of the terminal units being provided with one or more associated load-switching circuits defining the associated terminal units as being connected to one or more loads, each load-switching circuit comprising:

a latch-in load driving relay having a main contact for connecting and disconnecting the load and having a first changeover contact, two first fixed contact members which are connected in said load-switching circuit respectively between said first changeover contact and two first diodes of opposite polarity which alternatively conduct to allow current to flow in a respective direction in said load-switching circuit;

reversing switch means connected between an AC power source and the load driving relay and having a second changeover contact, two second fixed contact members which are connected in said load-switching circuit respectively between said second changeover contact and two second diodes of opposite polarity for responding to the control signal from the central controller unit to alternatively cause the conduction of said two second diodes to allow current to flow in a respective direction in said load-switching circuit;

manual switch means connected in parallel with said reversing switch means for operating said load-switching circuit independently of the function of said reversing switch means; and a photocoupler detecting means including a light emitting diode connected in parallel with said reversing switch means for emitting light in response to the current flowing in one direction in said load-switching circuit, and a photodetector which detects the emission of light and transmits a response signal representative of such emission to the central controller unit;

said load driving relay being responsive to a forward current flow throgh either of the two first diodes to move said main contact for connecting and disconnecting the load and at the same time to move the first changeover contact from one position to another position;

said reversing switch means further including a normally open contact connected in series with said second changeover contact, both the normally open contact and the second changeover contact being controlled by said control signal from the central controller unit in such a way that the second changeover contact moves subsequent to the closing of the normally open contact and is kept latched in its last position, whereby said second changeover contact when moving to either of two positions thereof in response to the control signal causes a current to flow in either of two directions in said load-switching circuit through the first and second diodes which are arranged in the same direction until the first changeover contact is reversed by said current to prevent further current flow, said manual switch means further comprising a single momentary action switch device and an operating circuit which upon a predetermined operation of the switch device detects which of said two first diodes are connected in the load-switching circuit and causes current to flow in the load-switching circuit in the corresponding direction allowed by the thus detected first diode until the other first diode becomes connected in said load-switching circuit to reverse the load driving relay.

* * * * *